US005820990A

United States Patent [19]

Anastasie

[11] Patent Number: 5,820,990

[45] Date of Patent: Oct. 13, 1998

[54] BURGLAR-PROOF GLASS PANE

[76] Inventor: Maurice Gustave Eugene Anastasie, 24 rue Louis-Blanc, Paris, France, 75010

[21] Appl. No.: 553,705

[22] PCT Filed: Jun. 3, 1994

[86] PCT No.: PCT/FR94/00655

§ 371 Date: Feb. 1, 1996

§ 102(e) Date: Feb. 1, 1996

[87] PCT Pub. No.: WO94/29821

PCT Pub. Date: Dec. 22, 1994

[30] Foreign Application Priority Data

Jun. 4, 1993 [FR] France .................................. 93 06693

[51] Int. Cl.[6] .......................... B32B 17/10; G08B 13/04

[52] U.S. Cl. .......................... 428/432; 428/412; 428/433

[58] Field of Search .................................. 428/412, 432, 428/433

[56] References Cited

U.S. PATENT DOCUMENTS 4,641,507 2/1987 Demonbreun ............................ 70/339

FOREIGN PATENT DOCUMENTS 0451608 10/1991 European Pat. Off. ........ B32B 17/10

*Primary Examiner*—D. S. Nakarani
*Attorney, Agent, or Firm*—Greenblum & Bernstein, P.L.C.

[57] ABSTRACT

A burglar-proof glass pane including a glass plane metallized on one of its faces. A small sized metal electrode is placed in contact with the non-metallic face of the pane and a high voltage is applied thereto by means of a transformer supplying a low current at high frequency.

22 Claims, No Drawings

BURGLAR-PROOF GLASS PANE

BACKGROUND OF THE INVENTION

1. Field of the Invention

The present invention is related to a burglar-proof pane of glass.

2. Discussion of Background and Related Information

Intruders, such as thieves, are known to enter buildings through bay windows, for example, whose panes hardly resist shock. As a result, there have appeared on the market composite panes formed by alternate plates of glass and sheets of plastic materials of various origins (such as films of polyester or plates of polycarbonate).

Such panes are expensive and their positioning on existing window frames poses problems.

Added to the foregoing problem is the fact that if such panes make it possible to delay intrusion into a premises, they cannot oppose such intrusion when they are smashed, even if the smashing of such panes sets off an audible alarm, the deterrent effect of such alarm being entirely relative.

The problem involves utilizing means that act effectively during the breaking of the window panes. One solution is the formation of an electrified barrier, which is a very hypothetical solution, since window panes made of glass, for example, are not electrical conductors.

However, there are panes which comprise fine metallic particles on one of their surfaces. These panes are presently known to be used for reflecting infrared solar radiation.

In the present state of the art, such panes cannot be electrified because the problem of providing for electrical connection has not been resolved.

SUMMARY OF THE INVENTION

It is an object of the present invention to provide a solution to the problem of providing an electrical connection for the above-mentioned type of window pane.

More particularly, it is an object of the invention to apply, on the non-metallic surface of the pane, a metallic electrode to which a high voltage is applied by means of a transformer supplying a very low current at a high frequency.

Due to the low magnitude of the current, an intruder is not harmed if the pane of the invention is broken upon intrusion, while an electric arc is created and a violent shaking is nevertheless sensed, which can itself be used to deter the intruder and, further, to trigger an alarm.

DETAILED DESCRIPTION OF THE PREFERRED EMBODIMENTS

According to the invention, as mentioned above, on the non-metallic surface of a window pane, such as a surface of a glass pane, a metallic electrode is affixed, to which a high voltage is then applied by means of a transformer supplying a very low current at a high frequency.

The electrode, whose surface is very reduced with respect to the surface of the pane, is covered with an insulating material. The electrode can be hidden under the frame of the pane.

In normal operation, anyone can approach the window pane and touch it without harm. On the other hand, if during an attempted burglary, the pane is simply broken or split, an arc forms immediately and a violent shaking is felt by the intruder. This paralyzing shaking is without danger to the health of the burglar because the intensity of the current that circulates has been set in a manner so as to remain below the critical physiological threshold.

Satisfactory results have been obtained for voltages varying from 100 to 300,000 volts at frequencies varying from 100 Hz to 20 kHz.

Experience has shown that a galvanometer positioned at a certain distance from the pane registers a potential difference and that the value of the latter was modified if a person approached the pane and touched it. According to the invention, the signal thus produced can be utilized to control an alarm device, making it possible, for example, to make use of the deterrent phenomena.

Different solutions can be considered for utilizing the apparatus of the invention.

If a glass plate is utilized which is metallized at its surface, the metallized surface is covered with a glass plate or a plastic film.

The pane can be formed with the aid of two glass plates surrounding a metallized plastic film, the plastic film having the advantage of reinforcing the mechanical resistance of the pane.

In the two cases mentioned above, the manufacture of the composite pane can be achieved by known techniques, the assembly thus formed being transparent.

The invention also is applicable to modifying an existing pane which had been manufactured without the invention. In the case of an existing pane, a metallized plastic film is affixed, by means of a known adhesive, against one of the surfaces of the pane, the film then being covered with a second transparent film. The second film is plastic and adhesive. Preferably, the electrode is applied against the second film, which can be replaced by a transparent and rigid plate of polycarbonate. If the second film, or the above-mentioned plate, is thin, an insulating material, such as a glass plate, can be interposed between the electrode and its support to protect the film or the plate. In all cases, the assembly thus formed can be transparent.

What is claimed:

1. A burglar-proof pane of glass comprising:

a plate of glass having a non-metallized surface and metallic particles adhering to another surface to form a metallized surface;

a metallic electrode applied against said non-metallized surface; and a source of very low current at high frequency and high voltage applied to said electrode.

2. A burglar-proof pane of glass according to claim 1, wherein:

said source comprises a transformer.

3. A burglar-proof pane of glass according to claim 1, wherein:

said high voltage is within a range of 100 to 300,000 volts and said high frequency is within a range of 100 Hz to 20 kHz.

4. A burglar-proof pane of glass according to claim 1, further comprising:

an insulating material covering said electrode.

5. A burglar-proof pane of glass according to claim 1, further comprising:

an insulating material interposed between said electrode and said non-metallized surface.

6. A burglar-proof pane of glass according to claim 1, further comprising:

a transparent mechanical reinforcing layer applied over said metallized surface of said glass plate to thereby form a transparent assembly.

7. A burglar-proof pane of glass according to claim 6, wherein:

said transparent mechanical reinforcing layer comprises a plastic film.

8. A burglar-proof pane of glass according to claim 6, wherein:

said transparent mechanical reinforcing layer comprises a plastic plate.

9. A burglar-proof pane of glass according to claim 6, wherein:

said transparent mechanical reinforcing layer comprises a glass plate.

10. A burglar-proof pane of glass according to claim 1 in combination with frame, wherein:

said electrode is hidden beneath said frame.

11. A burglar-proof pane of glass comprising:

a first layer comprising a glass plate;

a second layer comprising a film of plastic having metallic particles adhering to a surface of said plastic film to form a metallized surface, said film of plastic being secured to a surface of said glass plate with an adhesive to form a sub-assembly;

a third layer covering said second layer, secured to said sub-assembly to form an assembly having a non-metallized surface;

a metallic electrode applied against said non-metallized surface of said assembly; and a source of very low current at high frequency and high voltage applied to said electrode.

12. A burglar-proof pane of glass according to claim 11, wherein:

said assembly is transparent.

13. A burglar-proof pane of glass according to claim 11, wherein:

said third layer comprises a plastic film.

14. A burglar-proof pane of glass according to claim 11, wherein:

said third layer comprises a plastic plate.

15. A burglar-proof pane of glass according to claim 11, wherein:

said glass plate comprises a first glass plate; and said third layer comprises a second glass plate.

16. A burglar-proof pane of glass according to claim 11, wherein:

said source comprises a transformer.

17. A burglar-proof pane of glass according to claim 11, wherein:

said high voltage is within a range of 100 to 300,000 volts and said high frequency is within a range of 100 Hz to 20 kHz.

18. A burglar-proof pane of glass according to claim 11, further comprising:

an insulating material covering said electrode.

19. A burglar-proof pane of glass according to claim 11, further comprising:

an insulating material interposed between said electrode and said non-metallized surface of said assembly.

20. A burglar-proof pane of glass according to claim 11 in combination with frame, wherein:

said electrode is hidden beneath said frame.

21. A burglar-proof pane of glass comprising:

a plate of glass have a non-metallized surface and metallic particles adhering to another surface to form a metallized surface;

a metallic electrode applied against said non-metallized surface; and a source of current at high frequency and high voltage applied to said electrode, said current having a magnitude below a critical physiological threshold.

22. A burglar-proof pane of glass according to claim 21, wherein:

said high voltage is within a range of 100 to 300,000 volts and said high frequency is within a range of 100 Hz to 20 kHz.

* * * * *